United States Patent [19]

Court

[11] Patent Number: 5,476,887
[45] Date of Patent: Dec. 19, 1995

[54] FLAME RETARDANT POLYAMIDES

[75] Inventor: Trevor L. Court, Genolier, Switzerland

[73] Assignee: E. I. Du Pont de Nemours & Company, Wilmington, Del.

[21] Appl. No.: 244,371

[22] PCT Filed: Dec. 14, 1992

[86] PCT No.: PCT/US92/10558

§ 371 Date: Aug. 17, 1994

§ 102(e) Date: Aug. 17, 1994

[87] PCT Pub. No.: WO93/12172

PCT Pub. Date: Jun. 24, 1993

[30] Foreign Application Priority Data

Dec. 18, 1991 [DE] Germany .................. 41 41 861.1

[51] Int. Cl.⁶ ............................................. C08K 5/34
[52] U.S. Cl. ..................... 524/100; 524/101; 524/493
[58] Field of Search ............................. 524/100, 101, 524/493

[56] References Cited

U.S. PATENT DOCUMENTS 4,001,177  1/1977  Tsutsumi et al. ................... 524/100
4,360,616  11/1982  Pagilagan ........................... 524/100

*Primary Examiner*—Morton Foelak

[57] ABSTRACT

Flame retardant polyamide compositions are provided which contain melamine as the flame retardant. Flame retardant benefits are particularly realized by a composition which is a blend of melamine with a copolymer of polyamide-6,6 with another dicarboxylic acid, said copolymer having a melting point below 250° C.

2 Claims, No Drawings

FLAME RETARDANT POLYAMIDES

BACKGROUND OF THE INVENTION

This application is a 371 of PCT/92/105,558 filed Dec. 14, 1992.

This invention relates to certain flame retardant polyamides and more particularly to such polyamides where the polyamides are copolymers of polyamide 6.6.

The use of melamine and melamine derivatives such as melamine cyanurate as flame retardant agents for polyamides has been known for many years (U.S. Pat. No. 3,660,344 and U.S. Pat. Re. No. 30,402). In the case of polyamide 6.6, which is specifically used for its better thermal aging properties, versus polyamide 6, this has not been achieved with melamine because its volatility creates a large amount of melamine white mold deposition. Additionally, blooming of melamine from molded pieces under various simulated use condition has been noted previously (U.S. Pat. No. 4,525,505) as a reason why this art has not been practiced commercially. The volatility of melamine and its tendency to sublime at typical polyamide 6.6 molding temperatures (270° C.–290° C.) has generally rendered melamine-containing polyamide 6.6 compositions unattractive from a commercial point of view. The alternative to melamine has been the use of melamine derivatives or its condensation products such as melamine cyanurate; but, although these have presented solutions to the melamine blooming tissues, they have proved difficult to scale-up to typical commercial processes without some loss of flammability control.

The object of the invention is to provide unreinforced flame retardant polyamide molding compositions which have melamine as the flame retardant and which consistently meet the UL94 V-0 criteria at all the specified thicknesses according to standards described for commercial acceptability based on statistical representation whilst at the same time rain,zing any blooming of melamine during the molding process without reducing the thermal resistance properties of the polyamides.

SUMMARY OF THE INVENTION

The present invention provides a flame retardant polyamide composition consisting essentially of:

(a) a polyamide having a melting point of below about 250° C.; and (b) 10–20% by weight of melamine based on the weight of the composition.

Also provided is a filled polyamide composition wherein 20–50% by weight of a filler is added to the aforesaid composition. Further provided is a shaped article formed from the aforesaid unfilled or filled polyamide compositions.

DETAILED DESCRIPTION OF THE INVENTION

The object of the present invention has been accomplished by combining a polyamide having a melting point of below about 250° C. with melamine whereby the resulting composition contains 10–20% by weight of melamine.

Specifically, the melting point of polyamide 6.6 (m.p.= about 260° C.) is lowered to a temperature below about 250° C., preferably below about 245° C., and most preferably in the range of about 230° C.–245° C. This is accomplished by copolymerizing polyamide 6.6 with another monomer copolymerizable with it and which provides a copolymer melting point in the ranges stated above. Additional benefits in terms of long term aging are realized by the addition of a small amount of a heat stabilizer, preferably copper iodide. Other additives well known to those in the polyamide processing and molding art can be used as desired.

Suitable polyamides include those described in U.S. Pat. Nos. 2,071,250, 2,071,250, 2,130,523, 2,130,948, 2,241,322, 2,312,966, 2,512,606, and 3,393,210. These polyamides are well known in the art and embrace those semi-crystalline and amorphous polymers having a molecular weight of at least 5,000 and commonly referred to as nylons.

The polyamide can be produced by condensation of equimolar amounts of a saturated dicarboxylic acid containing from 4–12 condensation of equimolar amounts of a saturated dicarboxylic acid containing from 4 to 12 carbon atoms with a diamine, in which the diamine contains from 4 to 14 carbon atoms. Excess diamine can be employed to provide an excess of amine end groups over carboxy end groups in the polyamide.

Examples of polyamides include copolymers of polyhexamethylene adipamide (66 nylon), which melt below 250° C., polyhexamethylene azelaamide (69 nylon), polyhexamethylene sebacamide (610 nylon), and polyhexamethylene dodecanoamide (612 nylon), the polyamide produced by ring opening of lactams, i.e., polycaprolactam, polylauric lactam, poly-11-amino-undecanoic acid, bis (paraaminocyclohexyl) methane dodecanoamide. It is also possible to use in this invention polyamides prepared by the copolymerization of two of the above polymers or terpolymerization of the above polymers or their components, e.g., for example, an adipic, isophthalic acid hexamethylene diamine copolymer. Preferably, the polyamides are linear with a melting point in excess of 200° C., but below 250° C. Specifically, modified PA6.6 (particularly a 6.6–6 copolymer), PA6, PA6.10, PA6.12, PA11, PA12, PA12.12, PA6/6.6, etc. may be used. Particularly preferred because of high physical properties is a 6.6 polymer whose melting point is lowered by copolymerization with another monomer such as caprolactam, a dicarboxylic acid of 7–14 carbon atoms, m-benzenedicarboxylic acid, o-benzenedicarboxylic acid, or p-benzenedicarboxylic acid. The important parameter being that the polyamide used has a melting point below about 250° C.

There are no special restrictions as to molecular weight of the polyamides. Preferable are polyamides with a relative viscosity (RV) according to ASTM D789 of 20 to 70, preferably 40–60.

The compositions of the invention are prepared by thoroughly mixing melamine, the polyamide copolymer, and any of the other fillers and additives used in an extruder/ screw combination which is specifically intended for the compounding of powders into thermoplastic resin. During mixing, particularly in an extruder, the hold-up time should be short enough so as to avoid or minimize a lowering of the polyamide copolymer melting point and consequent crafting of the melamine to the copolymer. While hold-up time will vary somewhat depending upon the exact copolymer composition and temperatures used, a hold up time less than 30 seconds is sufficient. The resulting extrudate is cooled, pelletized and dried before molding the resulting composition into shaped articles.

The flame retardant polyamide compositions can also contain conventional additives, fillers, and reinforcing agents such as lubricants, mould-release agents, stabilizers, dyes, pigments, color concentrates, flow agents, glass and organic fibers, chalk, quartz, and mineral fillers such as magnesium hydroxide. Fillers and reinforcing agents are used at concentrations of 20–50% based on the weight of the composition. In addition, nucleation agents for the polyamide copolymer can be added so as to increase the crystallinity of the copolymer. Increased crystallinity results in an increase in copolymer physical properties over those of the unnucleated copolymer.

It has been found previously that polyamides containing melamine do not pass the UL94 V-0 classification at all thicknesses of test specimens, particularly when production is scaled up from small laboratory to larger commercial scale equipment (due in pan to difficulties in controlling temperature and dispersion of the flame retardant in the resin); they fail by having flaming drips which ignite cotton wadding placed directly under the test specimen during the test, the extruder up to the die. About 1% of other additives such as waxes and heat stabilizers (including 0.05% copper iodide) were also mixed into each composition. As a control, a commercially available flame retardant (FR) nylon was also tested; this resin contained 72% polyamide 6.6, 17% polyamide 6, 10% melamine cyanurate, and 1% other minor additives. Extrusion of this control was at about 270° C.

Test bars were molded at 240° C. to give bars 127 mm×12.7 mm×1.6 mm (or 0.8 mm). Physical properties were tested according to ASTM D638, D790, D256, D789 and UL94. The results are shown in Table I.

TABLE I

|  | FR Nylon | Example Number ||||||
|---|---|---|---|---|---|---|---|
|  |  | A | B | 1 | 2 | 3 | C |
| Melamine cyan. (%) | 10 | — | — | — | — | — | 12 |
| Melamine (%) | — | 6 | 8 | 10 | 12 | 15 | — |
| PROPERTIES |  |  |  |  |  |  |  |
| T.S. at Yield (MPa) | 82.1 | 83.4 | 81.5 | 77.1 | 76 | — | 82.4 |
| T.S. at Break (MPa) | 76.2 | 76.5 | 70.1 | 62.4 | 683 | — | 77 |
| Elongation at Yield (%) | 32 | 3.9 | 42 | 4.2 | 4.1 | — | 3.6 |
| Elooption at Bran (%) | 9.3 | 7.9 | 10.7 | 17.1 | 9.9 | — | 5.5 |
| Flex Mod (GPa) | 3.48 | 3.09 | 3.19 | 3.27 | 3.42 | — | 3.42 |
| NI (J/M) | 33 | 32 | 33 | 31 | 31 | — | 32 |
| UNI (J/M) | 834 | 51 | 1061 | 940 | 779 | — | 676 |
| STD UL94 at 1.6MM | V-0 | V-2 | V-2 | V-2 | V-0 | V-0 | V-0 |
| STD UL94 at 0.8MM | V-0 | V-2 | V-0 | V-0 | V-0 | V-0 | V-0 |
| UL94 % fails at 1.6MM | 25 | 50 | 20 | 15 | 1 | 0 | 25 |
| UL94 % falls at 0.8MM | — | — | — | — | 0 | 0 | — |
| RELATIVE VISCOSITY | 48.2 | 453 | 41.7 | 40.1 | 39.2 | — | 42.2 | particularly those 1.6 mm in thickness. As a result, these compositions receive a V-2 classification. Surprisingly, the polyamides of the present invention pass the V-0 classification with statistically significant regularity; thus with commercial reliability. Additionally, no evidence of previously reported blooming is observed on molded parts upon aging at elevated temperatures and humidity.

In the examples which follow, 100 test bars (50 at each condition described in the UL94 test) were tested in order to give a percentage of the total which fail by igniting the cotton. This percent failure can then through experience of the manufacturing process and the variability in the test method itself be correlated with the ability to reliably make commercial flame retardant resins which consistently pass the UL94 test at V-0. In these examples, parts and percentages are by weight unless indicated otherwise.

EXAMPLES

Example 1–3

A polyamide 6.6–6 copolymer was prepared by polymerizing hexamethylene aliamine, adipic acid, and caprolactam to give a copolymer containing 85% 6.6 and 15% 6, and having a m.p. of about 235° C. and a relative viscosity of about 45–55 according to ASTM D789. Various amounts of melamine and melamine cyanurate ( as a control) were mixed with the copolymer using a corotating twin screw extruder having a die temperature of 250° C. and having a flat temperature profile of about 245° C. over the length of Test bars were aged for 8 weeks in an oven maintained at 120° C. and 50–100% relative humidity. No evidence of surface blooming of melamine occurred during this period.

Example 4

A filled polyamide copolymer composition was prepared using the copolymer of Examples 1–3. The procedures as set forth in these Examples were repeated on a composition which contained 20% melamine, 45% magnesium hydroxide as a mineral filler, 3% of a black color concentrate, and 0.5% of aluminum distearate as a lubricant.

Test bars were molded as described in Examples 1–3 and passed the UL94 test at 1.6mm as a V-0 classification.

I claim:

1. A flame retardant polyamidc composition consisting of:
   (a) a copolymer of polyamide 6.6 and at least one other monomer selected from the group consisting of a dicarboxylic acid of 7–14 carbon atoms, m-benzenedicarbozylic acid, o-benzenedicarboxylic acid, and p-benzenedicarboxylic acid; said copolymer having a melting point below 250° C.; and
   (b) 10–20% by weight of melamine based on the weight of the composition.

2. A composition according to claim 1 wherein the melamine concentration is in the range of 12–20% by weight.

* * * * *